W. B. Le NOIR.
Washing Apparatus.

No. 9,134. Reissued Mar. 30, 1880.

Witnesses:
C. Clarence Poole
Sw. Sulz

Inventor:
William B. Le Noir,
by Ellis Spear
Attorney

N. PETERS, PHOTO-LITHOGRAPHER, WASHINGTON, D. C.

UNITED STATES PATENT OFFICE.

WILLIAM B. LE NOIR, OF LOWER PEACH TREE, ALABAMA.

WASHING APPARATUS.

SPECIFICATION forming part of Reissued Letters Patent No. 9,134, dated March 30, 1880.

Original No. 214,827, dated April 29, 1879. Application for reissue filed January 19, 1880.

*To all whom it may concern:*

Be it known that I, WILLIAM B. LE NOIR, of Lower Peach Tree, in the county of Wilcox and State of Alabama, have invented a new and valuable Improvement in Washing Apparatus; and I do hereby declare that the following is a full, clear, and exact description of the construction and operation of the same, reference being had to the annexed drawings, making a part of this specification, and to the letters and figures of reference marked thereon.

Figure 1:
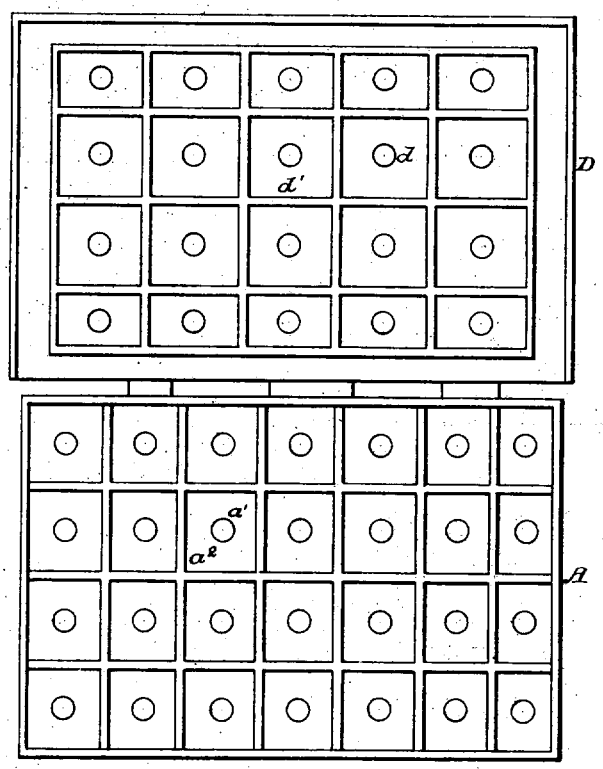
Figure 2:
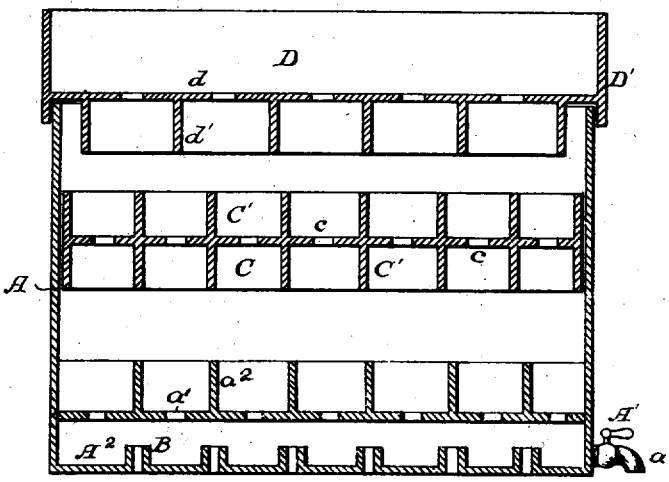

Figure 1 is a top view with the cover thrown back and one of the sections removed, and Fig. 2 a central longitudinal section.

The object of my invention is to utilize the waste-steam from engines, factories, steamboats, &c., as well as that generated in an ordinary stove wash-boiler, for the purposes of washing clothes, and to carry out this purpose in an effective manner by means of the apparatus which is the subject of this application.

The apparatus used by me is contained in a box or case, A, and which may be of any shape or size. Near the bottom of the box is secured a partition, A′, provided with perforations $a'$, as shown, and below this partition is a chamber, $A^2$, into which steam is admitted. I have shown in the drawings a series of tubes, B, rising a short distance above the bottom of the box, which particularly adapt the apparatus to be placed over a common wash-boiler.

A cock, $a$, enables the water that descends to be drawn off without entering the supply-openings. It is essential that this cock should be placed below the level of the supply-openings, and also that the perforations in the partition A′ should not be directly in line with the supply-openings.

The partition A′ is provided with a series of cells formed by intersecting vertical ribs or plates $a^2$, and the bottom of each cell contains a perforation.

C is a removable diaphragm placed within the case, provided with the upwardly and downwardly projecting cell-plates C′ and perforations $c$; and D is a hinged cover, provided with cell-plates $d'$ and perforations $d$, and such cover is also provided with a flange, D′, around it. The cover thus forms a hinged box with perforated bottom.

The tubes in the bottom of the box are shown as eighteen in number, while those in the next horizontal partition are twenty-eight in number. These numbers may be varied as desired; but it is desirable to retain about those proportions, and not to have the holes in each opposite to each other, and this fact should be true of all the holes from below upward. This arrangement renders the course of the steam through the box tortuous, and delays it in the clothes as long as desirable.

In the operation of my device I deposit the colored or foul clothes upon the lower partition, place the removable diaphragm above them, and place the finer linen or white clothes thereon and close the lid. A solution of soap and water or other cleansing solution is poured in the top, which gravitates slowly through the clothes, the steam rising through them at the same time.

The cell-plates $a^2$, C′, and $d'$ form cavities which act as distributers of the steam, these cavities becoming filled before the steam penetrates the clothes, thereby causing the steam to be gently distributed through the clothes. The upper ribs or strips, which form the cell-plates, support the clothes in addition to serving as distributers for the steam.

The foul water reaches the first steam-chamber and runs off through the stop-cock. When the clothes need rinsing clear water is poured in in the same manner and let off by the same outlet.

Placing the foul or colored clothes at the bottom prevents the dye, &c., from reaching the finer linen.

Having thus described my invention, what I claim as new, and desire to secure by Letters Patent, is—

1. A steam washing apparatus in which the clothes are washed by the passage of steam directly up and of water directly down through the clothes, consisting of a chamber to contain the clothes, a perforated false bottom, a steam-chamber below such false bottom, into which steam is admitted by tubes placed out of line with the perforations in the false bottom, and a stop-cock below the level of the inlet-openings of such tubes, all substantially as described.

2. In a steam washing apparatus in which the steam ascends directly through the clothes, a perforated false bottom provided with cells $a'$ $a^2$, formed by intersecting flanges, such cells forming steam-chambers, substantially as described and shown.

3. The combination, with the box or case A, of a removable diaphragm, C, provided with cell-plates and perforations, substantially as described and shown.

4. In a washing apparatus, the combination of the box or case A, the partitions A′ C, having perforations and cell-plates, and the perforated cover D, all substantially as described and shown.

5. The box A, having outlet stop-cock $a$ and tubes B, in combination with the partition A′, perforated at $a'$ to form a tortuous steam-passage, and having cell-plates $a^2$, and with a rectangular hinged cover, D, having projecting flanges D′ and perforations $d$, as specified.

6. The combination of the box A, having outlet stop-cock $a$, lid D, having flanges D′, perforations $d$, and cell-plates $d'$, partition A′, cell-plates $a^2$, and perforations $a'$, tubes B, and removable diaphragm C, having cell-plates C′ and perforations $c$, as and for the purposes specified.

In testimony whereof I have signed my name in the presence of two subscribing witnesses.

WILLIAM B. LE NOIR.

Witnesses:

JNO. M. WILLIAMSON;

D. P. HICKS.